US012710926B1

(12) United States Patent
Meyer et al.

(10) Patent No.: US 12,710,926 B1
(45) Date of Patent: Aug. 18, 2026

(54) INTEGRATED CIRCUIT FOR VECTOR COMPUTE ENGINE

(71) Applicant: Amazon Technologies, Inc., Seattle, WA (US)

(72) Inventors: Paul Gilbert Meyer, Jericho, VT (US); Sundeep Amirineni, Cedar Park, TX (US); Ron Diamant, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 906 days.

(21) Appl. No.: 17/937,329

(22) Filed: Sep. 30, 2022

(51) Int. Cl.
*G06F 7/57* (2006.01)

(52) U.S. Cl.
CPC ........ *G06F 7/57* (2013.01); *G06F 2207/3884* (2013.01)

(58) Field of Classification Search
CPC ......... G06F 7/57–575; G06F 2207/3884–3892
See application file for complete search history.

(56) References Cited

U.S. PATENT DOCUMENTS 4,914,614 A 4/1990 Yamakawa
4,959,811 A 9/1990 Szczepanek
5,072,418 A 12/1991 Boutaud et al.
5,117,498 A 5/1992 Miller et al.
5,459,681 A 10/1995 Harrison et al.
5,524,251 A 6/1996 Urasaki
6,052,773 A 4/2000 DeHon et al.
6,079,623 A 6/2000 Ahn et al.
6,105,105 A 8/2000 Trimberger
6,654,730 B1 11/2003 Kato et al.
6,757,284 B1 6/2004 Galles
7,755,631 B1 7/2010 Mrazek et al.
8,121,235 B1 2/2012 Sun et al.
9,081,634 B1 * 7/2015 Simkins ................ G06F 7/4806

(Continued)

FOREIGN PATENT DOCUMENTS

GB 2311882 A 10/1997

OTHER PUBLICATIONS

U.S. Non-Final Office Action dated Jul. 17, 2023, in U.S. Appl. No. 17/447,677.

(Continued)

*Primary Examiner* — Matthew D Sandifer
(74) *Attorney, Agent, or Firm* — Weaver Austin Villeneuve & Sampson LLP

(57) ABSTRACT

An integrated circuit device for vector computations can include multiple computational circuit blocks coupled in series in a pipeline. Each computational circuit block can include an arithmetic logic unit (ALU) circuit having a first numeric input, a second numeric input, and a primary result output. The ALU circuit is programmable to perform a computational operation on the first numeric input and the second numeric input to generate the primary result output. Each computational circuit block can also include an output register to receive the primary result output of the ALU and provide the primary result output of the ALU circuit as a primary output of the computational circuit block, and one or more feedback registers to receive the primary result output of the ALU and provide the primary result output of the ALU circuit to a previous computational circuit block of the pipeline.

21 Claims, 6 Drawing Sheets

(56) References Cited

U.S. PATENT DOCUMENTS 9,495,154 B2 11/2016 Khan
9,710,265 B1 7/2017 Temam et al.
10,120,580 B2 11/2018 Olcay
10,157,333 B1 12/2018 Wang et al.
10,210,860 B1 2/2019 Ward et al.
10,592,250 B1 3/2020 Diamant et al.
10,831,507 B2 11/2020 Shah et al.
10,942,742 B1 3/2021 Diamant et al.
11,003,429 B1 5/2021 Zejda et al.
11,036,827 B1 6/2021 Zejda et al.
11,182,337 B1 11/2021 Maiyuran et al.
11,561,791 B2 1/2023 Das Sarma et al.
12,072,836 B2 8/2024 Shah et al.
12,242,853 B1 * 3/2025 Meyer .................. G06F 9/3877
12,340,300 B1 6/2025 Abts et al.
2004/0230784 A1 11/2004 Cohen
2005/0144215 A1 * 6/2005 Simkins ................ G06F 7/5443 708/620
2005/0273481 A1 12/2005 Dent
2006/0095739 A1 5/2006 Selvaggi et al.
2006/0212499 A1 * 9/2006 New ......................... G06F 7/57 708/200
2006/0230092 A1 * 10/2006 Ching .................. G06V 10/955 708/490
2006/0253689 A1 11/2006 Knowles
2006/0288070 A1 * 12/2006 Vadi .................. H03K 19/1737 708/524
2007/0073922 A1 3/2007 Go et al.
2007/0240142 A1 10/2007 Brokenshire et al.
2009/0119460 A1 5/2009 Lin et al.
2009/0293048 A1 11/2009 Chen et al.
2012/0017066 A1 * 1/2012 Vorbach .................... G06F 9/38 712/E9.003
2013/0258376 A1 10/2013 Tsuchiya
2014/0317333 A1 10/2014 Dorst et al.
2015/0277924 A1 10/2015 Zappulla et al.
2018/0113006 A1 4/2018 Tyrer
2018/0253877 A1 9/2018 Kozub et al.
2018/0336164 A1 11/2018 Phelps et al.
2019/0034785 A1 1/2019 Murray et al.
2019/0042248 A1 2/2019 Bradford et al.
2019/0205737 A1 7/2019 Bleiweiss et al.
2019/0266217 A1 8/2019 Arakawa et al.
2019/0377580 A1 12/2019 Vorbach et al.
2020/0057748 A1 * 2/2020 Danilak .................. G06F 15/78
2020/0211189 A1 7/2020 Yip et al.
2020/0272882 A1 8/2020 Lo
2020/0311531 A1 10/2020 Liu et al.
2020/0342632 A1 10/2020 Frumkin et al.
2020/0356837 A1 11/2020 Hargil et al.
2020/0409664 A1 12/2020 Li et al.
2021/0073171 A1 3/2021 Master et al.
2021/0109796 A1 4/2021 Fozard et al.
2021/0383199 A1 12/2021 Weissenborn et al.
2022/0229879 A1 * 7/2022 Thouppuarachchi ... G06F 17/13
2022/0283984 A1 9/2022 Kim et al.
2022/0284283 A1 9/2022 Yin et al.
2022/0343137 A1 10/2022 Surendran et al.
2022/0405556 A1 12/2022 Lichtenau et al.
2022/0414182 A1 12/2022 Adelman et al.
2023/0019151 A1 1/2023 Ahmadi et al.
2024/0193117 A1 * 6/2024 Kapre ................. G06F 13/4045
2024/0264975 A1 8/2024 Li et al.
2024/0303218 A1 9/2024 Zhao et al.

OTHER PUBLICATIONS

U.S. Non-Final Office Action dated Oct. 4, 2023, in U.S. Appl. No. 17/934,147.
U.S. Restriction Requirement dated Sep. 28, 2023, in U.S. Appl. No. 17/937,333.
Guo, R., et al., "How to Implement an Efficient LayerNorm CUDA Kernel OneFlow Performance Optimization," Medium, Dec. 2021,29 pages, URL: https://oneflow2020.medium.com/how-to-implement-an-efficient-layernorm-cuda-kernel-oneflow-performance-optimization-731 e91 a285b8.
Jacob, J. A., et al., "Memory Interfacing and Instruction Specification for Reconfigurable Processors," FPGA '99: Proc. of the 1999 ACM/SIGDA Seventh International Symposium on Field Programmable Gate Arrays, Feb. 1999, pp. 145-154.
Küçükkabak, U., et al., "Design and Implementation of Reciprocal Unit Using Table Look-up and Newton-Raphson Iteration," Proc. of the Euromicro Symposium on Digital System Design (DSD '04), 2004, IEEE, 5 pages.
Rakesh, "Average every 2 values in a list using a loop," Stack Overflow, Jul. 2018, 5 pages, URL: https://stackoverflow.com/questions/51175154/average-every-2-values-in-a-list-using-a-loop.
University of Illinois Urbana-Champaign, "Pipeline Motivation: Single-cycle datapath," Sep. 2011, pp. 1-31, URL: https://courses.grainger.illinois.edu/cs232/fa2011/lectures/L11.pdf.
U.S. Appl. No. 19/017,173, inventors Meyer P.G. et al., filed Jan. 10, 2025.
Welford, B. P., "Note on a Method for Calculating Corrected Sums of Squares and Products," Technometrics, Aug. 1962, vol. 4(3), pp. 419-432.
Cook, J., "Accurately Computing Running Variance", John D. Cook Consulting [blog], Nov. 1, 2014, pp. 1-3, URL: https://www.johndcook.com/blog/standard_deviation/ [retrieved on Feb. 8, 2023].
Ioffe, S. et al., "Batch Normalization: Accelerating Deep Network Training by Reducing Internal Covariate Shift", 32nd International Conference on Machine Learning (ICML 15), Mar. 2, 2015, pp. 1-11, URL: https://arxiv.org/abs/1502.03167v3.
U.S. Non-Final Office Action dated Sep. 27, 2022 in U.S. Appl. No. 17/447,677.
U.S. Appl. No. 17/447,675, inventor Meyer, filed Sep. 14, 2021.
U.S. Appl. No. 17/447,677, inventor Meyer, filed Sep. 14, 2021.
U.S. Appl. No. 17/934,145, inventors Tan et al., filed Sep. 21, 2022.
U.S. Appl. No. 17/934,147, inventors Tan et al., filed Sep. 21, 2022.
U.S. Appl. No. 17/935,415, inventors Meyer et al., filed Sep. 26, 2022.
U.S. Appl. No. 17/935,419, inventors Meyer et al., filed Sep. 26, 2022.
U.S. Appl. No. 17/937,333, inventors Meyer et al., filed Sep. 30, 2022.
U.S. Appl. No. 17/937,335, inventors Meyer et al., filed Sep. 30, 2022.
Wikipedia [webpage], "Algorithms for calculating variance", Mar. 24, 2001, pp. 1-14, URL: https://en.wikipedia.org/wiki/Algorithms_for_calculating_variance [retrieved on Feb. 8, 2023].
Stack Overflow, "Search max value and index inside Nested list", 2013, 3 pages, URL: https://stackoverflow.com/questions/18616793/search-max-value-and-index-inside-nested-list [retrieved on Feb. 27, 2023].
Stack Overflow, "How do I get indices of N maximum values in a NumPy array?", 2011, 16 pages, URL: https://stackoverflow.com/questions/6910641/how-do-i-get-indices-of-n-maximum-values-in-a-numpy-array [retrieved on Feb. 28, 2023].
U.S. Final Office Action dated Mar. 9, 2023 in U.S. Appl. No. 17/447,677.
Ba, J. L. et al., "Layer Normalization," arXiv:1607.06450v1 [stat.ML], Jul. 21, 2016, pp. 1-14.
Wu, Y. et al., "Group Normalization," arXiv:1803.08494v3 [cs.CV], Jun. 11, 2018, pp. 1-10.

* cited by examiner

INTEGRATED CIRCUIT FOR VECTOR COMPUTE ENGINE

BACKGROUND

Neural networks utilize computational models to perform complex tasks. A neural network can perform computations using a set of weights. Through these computations, the weights are combined with input data (which can also be referred to as feature maps) through multiple layers to perform an inference operation. For example, a neural network model can be used in natural language processing to translate and understand human language, or in computer vision systems to analyze and react to images and video frames. The weights used in a specific neural network can be determined via a training process in which the weight values are tuned to yield better predictions.

BRIEF DESCRIPTION OF THE DRAWINGS

Various embodiments in accordance with the present disclosure will be described with reference to the drawings, in which.

DETAILED DESCRIPTION

Matrix multiplication is a common type of computation used in neural networks. As such, much effort has been made to improve execution of matrix multiplication operations in hardware. For example, a systolic array is a hardware architecture that can provide much better matrix multiplication throughput than a general-purpose processor. Although a systolic array can significantly improve matrix multiplication throughput, a neural network may utilize other types of computations that may not be suitable for execution in a systolic array. For example, batch normalization is a common neural network training technique to normalize input data using the mean and variance of data samples. As another example, pooling is a common neural network operation to down sample a data set by selecting a data element or combing data elements from a window size of data elements. Even if some of these other neural network computations can be executed in the systolic array, it may be advantageous to offload such computations to a separate compute engine to preserve the computational bandwidth of the systolic array for matrix multiplication operations.

The techniques disclosed herein provide a compute engine to efficiently handle complex computations and offload computations from a systolic array. The compute engine may include multiple compute channels that can each stream in data elements from a vector of a tensor for high bandwidth processing. In some implementations, the compute engine can be referred to as a vector compute engine or a deep vector engine. Each compute channel may implement a computational pipeline that includes a set of arithmetic logic unit (ALU) stages coupled in series. Each ALU stage can be configured to perform a computational operation selected from various available operations on a set of inputs, and to provide the result to the next ALU stage. Each ALU stage can be implemented with feedback circuitry to store and feedback the computational result of that stage to a previous ALU stage. Each ALU stage can also include bypass circuitry to selectively provide one or more inputs to the next ALU stage. Each ALU stage may also be implemented with a swap out path to allow the ALU stage to retain an input value in the ALU stage for subsequent processing (e.g., to implement sorting operations).

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1:
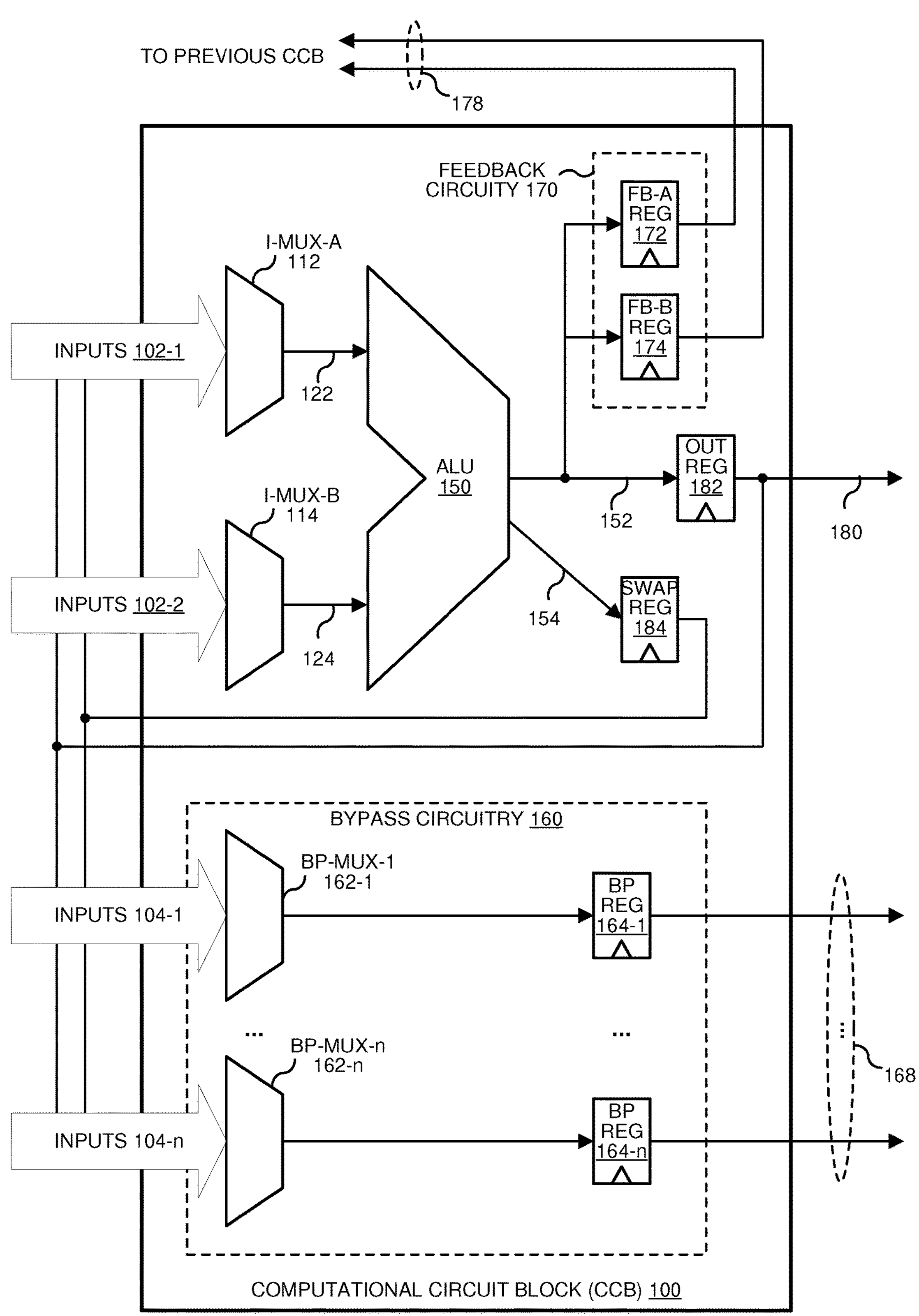
FIG. 1 illustrates a block diagram of an example of a computational circuit block.

FIG. 1 illustrates a block diagram of an example of a computational circuit block (CCB) 100 that can be implemented in a computational pipeline of an integrated circuit device. Computational circuit block 100 includes an arithmetic logic unit (ALU) circuit 150. ALU circuit 150 can be implemented to process floating-point numeric inputs of up to a certain bit length such as 32-bit floating point numbers (FP32). ALU circuit 150 can also be configurable to support numeric inputs of other datatypes such as 8-bit integers (INT8), 16-bit integers (INT16), 16-bit brain floating point numbers (BF16), 16-bit floating point numbers (FP16), or datatypes have a bit length that is less than or equal to the maximum supported datatype bit length. ALU circuit 150 includes a first numeric input 122 selected by an input multiplexor 112, a second numeric input 124 selected by an input multiplexor 114, and a primary result output 152. ALU circuit 150 can be programmed to perform various computational operations on first numeric input 122 and/or second numeric input 124 to generate primary result output 156.

For example, ALU circuit 150 can be programmed to generate primary result output 152 by selecting a computational operation from various available operations to perform on the numeric input(s). The computational operations may include one or more of a passthrough function (or identity function) of the first numeric input 122, bitwise inversion of the first numeric input 122, arithmetic left shift of the first numeric input 122 by a number of bits indicated by the second numeric input 124, arithmetic right shift of the first numeric input 122 by a number of bits indicated by the second numeric input 124, addition of the first numeric input 122 and the second numeric input 124, subtraction of the second numeric input 124 from the first numeric input 122, multiplication of the first numeric input 122 and the second numeric input 124, division of the first numeric input 122 by the second numeric input 124, select the maximum (MAX) of the first numeric input 122 and the second numeric input 124, select the minimum (MIN) of the first numeric input 122 and the second numeric input 154, bitwise AND of the first numeric input 122 and the second numeric input 124, bitwise OR of the first numeric input 122 and the second numeric input 122, bitwise XOR of the first numeric input 122 and the second numeric input 124, logical AND of the first numeric input 122 and the second numeric input 124, logical OR of the first numeric input 122 and the second numeric input 122, logical XOR of the first numeric input 122 and the second numeric input 124, logical left shift of the first numeric input 122 by a number of bits indicated by the second numeric input 124, logical right shift of the first numeric input 122 by a number of bits indicated by the second numeric input 124, etc. In some implementations, the computational operations may also include comparison functions such as whether the first numeric input 122 is equal to, not equal to, greater than, great than or equal to, less than or equal to, and/or less than the second numeric input 124, etc. Other supported computational operations may include an absolute difference between the first numeric input 122 and the second numeric input 124, selection of the first numeric input 122 or the second numeric input 124, and/or other functions to generate a value based on the first numeric input 122 and/or the second numeric input 124. ALU circuit 150 can also be programmed to apply the computational operation with the first numeric input 122 reversed with the second numeric input 124. Although various computational operations have been described, depending on the application and usage of ALU circuit 150, the computational logic within ALU circuit can be simplified to support fewer of the computational operations described above. In some implementations, ALU circuit 150 can also support other computational operations not specifically described.

ALU circuit 150 may include a secondary output 154 to loopback the first numeric input 122 or the second numeric input 124 to computational circuit block 100. This secondary output 154 can provide a swap out path for the ALU circuit 150 to retain a value that was inputted into the ALU circuit 150 (e.g., by storing the value in a swap register 184). This capability of ALU circuit 150 allows a computation pipeline composed of such ALU stages to provide native hardware support for ordering manipulations such as sorting a series of data elements, or finding and locating data elements of a vector being streamed into the pipeline. For example, when ALU circuit 150 is programmed to perform a maximum function, the larger of the first numeric input 122 and the second numeric input 124 can be outputted to the next ALU stage, and the other unselected numeric input can be outputted on the secondary output 154. Similarly, when ALU circuit 150 is programmed to perform a minimum function, the smaller of the first numeric input 122 and the second numeric input 124 can be outputted to the next ALU stage, and the other unselected numeric input can be outputted on the secondary output 154.

Computational circuit block 100 includes an output register 182 configured to receive the primary result output 152 of ALU circuit 150, and provide the primary result output 152 of ALU circuit 150 as the primary output 180 of computational circuit block 100 to the next CCB. By registering primary result output 152, pipeline stages of computational circuit blocks can be coupled in series to create a computational pipeline in which input values are operated on at each clock cycle by an ALU stage, and the result is provided to the next ALU stage for further processing in the next clock cycle. Computational circuit block 100 also includes a swap register 184 configured to receive the secondary output 154 of ALU circuit 150, and to feedback the secondary output 154 as one of the inputs to the computational circuit block 100 at the next clock cycle. As mentioned above, the swap register 184 can be used to store and retain a value being streamed into computational circuit block 100 to allow efficient sort, search, and/or locate functions to be performed.

Computational circuit block 100 may also include feedback circuitry 170 having one or more feedback registers that are each configured to receive the primary result output 152 of the ALU circuit 150, and provide the primary result output 152 of the ALU circuit 150 to a previous computational circuit block of the pipeline. In some implementations, the feedback circuitry 170 can include multiple feedback registers to enable computational circuit block 100 to maintain and store multiple running computational results on different sets of data elements being streamed into the pipeline. For instance, feedback circuitry 170 may include two feedback registers 172 and 174 that are each individually configured to receive the primary result output 152 of the ALU circuit 150 to feedback to the previous computational circuit block. Each of feedback registers 172 and 174 can have its own independent enable signals. During operation, computational circuit block 100 can be programmed to sequentially enable to the first feedback register 172 alternately with the second feedback register 174 at each clock cycle. Hence, the first feedback register 172 will be updated with the computational result of ALU circuit 150 every other clock cycle, and the second feedback register 172 will be updated with the computational result of ALU circuit 150 alternately in the clock cycles in between. This allows computational circuit block 100 to maintain a first computational result in feedback register 172 that are computed from odd sequenced data elements (e.g., first, third, fifth, etc. data elements being streamed into the pipeline), and a second computational result in feedback register 174 that are computed from even sequenced data elements (e.g., second, fourth, sixth, etc. data elements being streamed into the pipeline). For example, feedback register 172 can be used to maintain a running sum of the odd sequenced data elements of an input vector, and feedback register 174 can be used to maintain a running sum of the even sequenced data elements of the input vector. By controlling the independent enables of the feedback registers, running computational results of various data patterns can be achieved.

Computational circuit block 100 may also include bypass circuitry 160 having one or more bypass circuits each including a bypass multiplexor coupled to a bypass delay register. Each bypass circuit is operable to independently select one of the inputs of computational circuit block 100 to output to the next computational circuit block of the pipeline on bypass outputs 168. For example, bypass circuitry 160 may include bypass multiplexor 162-1 to select an input for bypass delay register 164-1, and bypass multiplexor 162-*n* to select an input for bypass delay register 164-*n*. In some implementations, computational circuit block 100 may include, for example, at least three bypass circuits, six bypass circuits, or other number of bypass circuits. When coupled in a pipeline, bypass circuitry 160 enables an input data element or an intermediate computational result to be provided to different ALU stages in the pipeline. Bypass circuitry 160 also provides the capability for the different ALU stages to receive independent inputs, and allows the different ALU stages in the pipeline to operate independently on different sets of inputs.

Computational circuit block 100 may include an input multiplexor for each of the numeric inputs of the ALU circuit 150, as well as a bypass multiplexor for each of the one or more bypass circuits. In the implementation shown in FIG. 1, computational circuit block 100 has input multiplexors 112 and 114, and bypass multiplexors 162-1 to 162-*n*. Each of these multiplexors may independently select an input from a set of inputs of the computational circuit block 100. For example, input multiplexor 112 may select an input from the set of inputs 102-1 to provide as the first numeric input 122 for ALU circuit 150; input multiplexor 114 may select an input from the set of inputs 102-2 to provide as the second numeric input 124 for ALU circuit 150; bypass multiplexor 162-1 may select an input from the set of inputs 104-1 to provide to bypass delay register 164-1; and bypass multiplexor 162-*n* may select an input from the set of inputs 104-*n* to provide to bypass delay register 164-*n*.

Each set of inputs 102-1, 102-2, 104-1, and 104-*n* may include one or more of the following inputs: a primary output of the previous computational circuit block of the pipeline (or an input to the pipeline if it is the first computational circuit block), any of the outputs of the bypass circuits of the previous computational circuit block (or one of the inputs to the pipeline if it is the first computational circuit block), the primary output 180 of the computational circuit block 100 itself, the output of the swap register 184, and/or any of the outputs of the feedback registers from the next computational circuit block. In some implementations, the set of inputs 104-1 to 104-*n* selectable by each of the bypass multiplexors can be the same set of inputs, and the set of inputs 102-1 and 102-2 selectable by each of the input multiplexors can be the same set of inputs. Furthermore, the set of inputs 104-1 to 104-*n* can be the same as the set of inputs 102-1 and 102-2. Having each of the multiplexors able to select from the full set of inputs available to the computational circuit block 100 provides flexibility to program the computational circuit block 100 to perform various types of computations. Nevertheless, in some implementations, any one or more of the sets of inputs 102-1, 102-2, and 104-1 to 104-*n* may contain one or more inputs that are not available in another set of inputs, or may lack one or more inputs that are included in another set of inputs.

It should be noted that although computational circuit block 100 has been shown in FIG. 1 to include various features such as bypass circuitry 160, feedback circuitry 170, and swap register 182, other implementations of the computational circuit block may omit one or more components shown in FIG. 1. For example, a computational circuit block may include just one feedback register, or just one bypass circuit, or may include feedback circuitry without bypass circuitry, or may include bypass circuitry without feedback circuitry, etc. Furthermore, computational circuit block 100 may include additional components not specifically shown.

Figure 2:
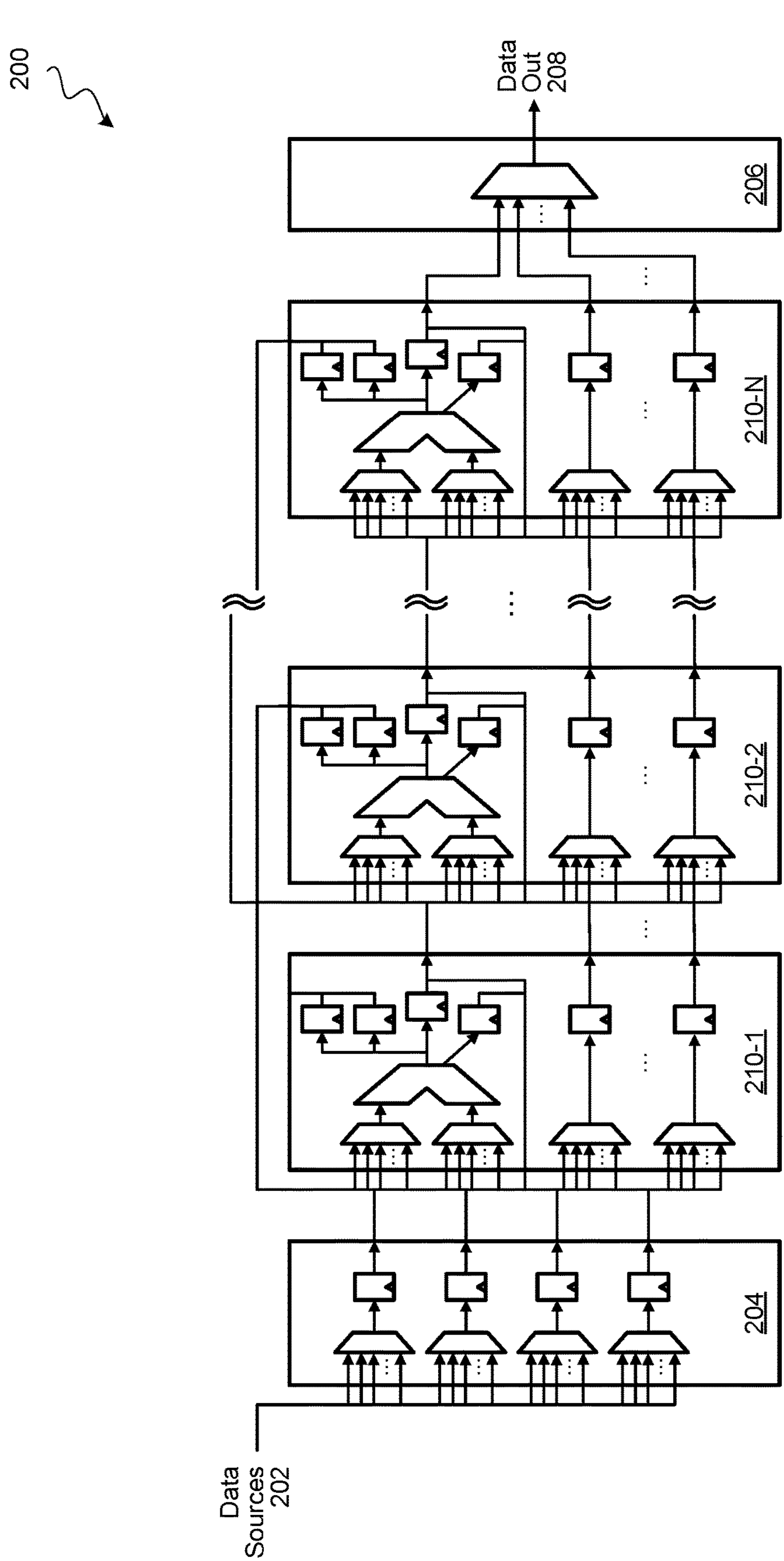
FIG. 2 illustrates a block diagram of an example of a compute channel.

FIG. 2 illustrates an example of an integrated circuit 200 implementing a compute channel formed by coupling multiple computational circuit blocks in series in a pipeline. Integrated circuit 200 can be, for example, part of a compute engine of a data processor (e.g., a data processing integrated circuit device such as a processor, a graphics processor, a digital signal processor, a tensor processor, a neural network accelerator, or other types of application specific integrated circuits). Integrated circuit 200 includes multiple computational circuit blocks 210-1 to 210-N coupled in series. The number of computational circuit blocks N can be at least four, at least eight, at least ten, at least sixteen, or other suitable number. Each computational circuit block in integrated circuit 200 can be implemented, for example, using computational circuit block 100. It should be noted that not each of the computational circuit blocks 210-1 to 210-N needs to be identical. For example, the first computational circuit blocks 210-1 does not have a previous computational circuit block to receive feedback outputs from the feedback circuitry. As such, the feedback circuitry can be omitted from the first computational circuit blocks 210-1. More generally, the components provided in each computational circuit block in the pipeline can be the same, or can vary depending on the application.

Each of computational circuit blocks 210-1 to 210-N includes an ALU circuit, and thus the pipeline in integrated circuit 200 can be considered as an ALU pipeline having multiple ALU stages coupled in series. Each ALU stage has a first numeric input, a second numeric input, and a primary result output. Each of the ALU stage is programmable to perform a computational operation on the first numeric input and/or the second numeric input of the ALU stage to generate the primary result output. The primary result output is provided to the next computational circuit block, which may select that primary result output as one of the numeric inputs to the ALU. For example, the primary result output of computational circuit block 210-1 is provided as an input to computational circuit block 210-2, and computational circuit block 210-2 may select the primary result output of computational circuit block 210-1 as one of the numeric inputs to the ALU stage of computational circuit block 210-2. Computational circuit block 210-2 can also select the primary result output of computational circuit block 210-1 to bypass the ALU stage and be outputted to the next computational circuit block 210-3 using the bypass circuitry.

Each of computational circuit blocks 210-1 to 210-N can be independently configured such that some or all of the ALU stages perform a different computational operation. Likewise, some or all of the ALU stages in the pipeline can be configured to perform the same computational operation. In some implementations, the multiplexors at the input interface of each computational circuit block can be independently configured to select any of the inputs that the computational circuit block receives. The bypass circuitry provided in each computational circuit block can also allow the computational circuit blocks in the pipeline to operate independently on different inputs.

For instance, a first set of inputs can flow into the first ALU stage of computational circuit block 210-1, and the result of the first ALU stage can flow into the second ALU stage of computational circuit block 210-2. The result of the second ALU stage of computational circuit block 210-2 can then be provided along a bypass path. For example, the bypass multiplexor of the next computational circuit block can select the primary output of computational circuit block 210-2, and provide the primary output of computational circuit block 210-2 along the bypass path down the pipeline to the subsequent computational circuit blocks. The primary output of computational circuit block 210-2 can be outputted by the bypass circuitry of the last computational circuit block 210-N.

Meanwhile, a second set of inputs can be provided along the bypass circuitry of computational circuit blocks 210-1 and 210-2. The input multiplexors for the ALU stage of the next computational circuit block can select this second set of inputs as the numeric inputs for the ALU. For example, the first input multiplexor and the second input multiplexor can select respective outputs of the bypass circuits of computational circuit block 210-2 to be used as the numeric inputs to the ALU circuit. The remaining ALU stages in the pipeline can operate on the result from this ALU circuit with the final result being outputted as the primary output of the last ALU stage of computational circuit block 210-N.

Hence, in this specific example, the first two ALU stages operate together on a first set of inputs, and the remaining ALU stages operate together on a second set of inputs. The bypass circuitry allows the two groups of ALU stages to operate independently from each other. In other scenarios, it's also possible to have two groups of ALU stages operate independently, and the results can be combined at a later ALU stage. These are just a few examples of the flexibility that the bypass circuitry provides on different ways that the pipeline can be configured and utilized.

In some implementations, the ALU pipeline can be designed to have no stalls such that data elements can be streamed into the pipeline at every clock cycle to maximize throughput. In other words, the pipeline can be designed to process a new data element at every clock cycle. In some scenarios, a data bubble (e.g., clock cycle with no valid data) may occur in the data stream inputted into the pipeline. This may occur, for example, if the memory providing the data elements to the pipeline or the memory being written with the computational result outputted from the pipeline is busy or reaches a bandwidth limit, causing a temporary pause in the data flow. In such scenarios, a nop (no operation) instruction can be executed by the ALU pipeline in each clock cycle of the temporary pause until the data stream resumes.

Certain computations may require multiple operations to be performed on a previous computational result to derive to an updated computational result from a new data element being streamed into the pipeline. For example, a running mean can be computed using Welford's algorithm:

$$m_n = m_{n-1}\left(1-\frac{1}{k}\right)+x_n*\left(\frac{1}{k}\right)$$

where k is the element count, $x_n$ is the $n^{th}$ data element, $m^{n-1}$ is the previous mean, and $m_n$ is the mean after including the $n^{th}$ data element. To compute the current mean value $m_n$, two operations are applied to the previous mean $m_{n-1}$. These two operations include multiplying the previous mean $m_{n-1}$ with $$\left(1-\frac{1}{k}\right),$$

and adding that result to $$\left(x_n*\left(\frac{1}{k}\right)\right),$$

the value of which can, be generated by a prior ALU stage. Hence, the feedback loop to compute the running mean can be implemented by configuring an ALU stage to perform the multiplication operation, and the next ALU stage to perform the addition operation. Because the feedback loop requires two operations and hence two clock cycles to complete, continuously streaming a set of data elements into the pipeline at every clock cycle will result in the pipeline toggling between a first running mean generated for the odd sequenced data elements, and a second running mean generated for the even sequenced data elements.

Maintaining and toggling between two running computational results such as the odd and even mean values is generally not an issue when data elements are continuously inputted into the pipeline one data element after another at every clock cycle. However, a pause or a bubble in the data stream can cause the two running computational results to go out of sync, and one of the running computational results can be dropped by the pipeline if it is not retained properly in the pipeline.

For computations that may have multicycle feedback loops such as the mean computation described above, the computational circuit block feeding back the running computational results can be implemented with multiple feedback registers. When a data bubble is encountered, the computational circuit block can safely maintain the separate running computational results, for example, by using a first feedback register to store the first running mean computed for the odd sequenced data elements, and a second feedback register to store the second running mean computed for the even sequenced data elements. During operation, the enables for the two feedback registers can be alternately toggled such that one feedback register tracks the odd mean value, and the other feedback register tracks the even mean value. When a pause in the data stream is encountered, the enable signals to the two feedback registers can be disabled such that the two running mean values are retained and stored separately in the two feedback registers. When the data stream is restarted, the alternate toggling of the enables for the two feedback registers can be resumed to continue tracking the two mean values in the separate feedback registers. Hence, by having multiple feedback registers to maintain and store respective running computational results, data bubbles in the data stream can be handled properly without causing the running computational results to go out of synch.

In addition to the computational circuit blocks 210-1 to 210-N, integrated circuit 200 may also include an input circuit 204 and an output circuit 206. Input circuit 204 is operable to provide input data selectable from multiple data sources 202 to the pipeline of computational circuit blocks 210-1 to 210-N. In some implementations, the data sources 202 may include a first tensor stored in a memory subsystem, a second tensor stored in a memory subsystem, a parameter table storing preloaded values, a pseudo-random number generator such as a linear feedback shift register, and/or a counter (e.g., that counts the number of input data elements). The selectable data sources 202 can include two different tensors being read from memory, because the ALU pipeline can be used to perform element-wise computations on two vectors simultaneously streamed into the pipeline to generate an output vector. The selectable data sources 202 may also include a programmable constant value, a zero value, a floating-point one value, an integer one value, a value representing positive infinity, and/or a value representing negative infinity, etc. In some implementations, the selectable data sources 202 may also include a power-of-two value (e.g., 8, 16, 24, etc.) which can be used for shifting or masking operations, and/or a bit mask value for masking one or more bytes (e.g., 0xff, 0xff00, 0xff0000 0xff000000, 0xffff, 0xffff0000, 0xffffff00, 0xffffffff, etc.). Each of the multiplexors in the input circuit 204 can independently select the same or different data source to provide to the first computational circuit block 210-1.

At the end of the ALU pipeline, the last computational circuit block 210-N can be coupled to an output circuit 206. The output circuit 206 is operable to select between a primary output of the last computational circuit block 210-N and respective outputs of the bypass circuits of the last computation circuit block 210-N as data output 208 to write to memory. In some implementations, output circuit 206 can be controlled to write the data output 208 to memory under certain prescribed conditions. For example, integrated circuit 200 can be configured to write the data output 208 to memory only when a predicate condition programmed in an ALU stage is met (e.g., the first numeric input of the designated ALU stage is equal to the second numeric input), or when a tensor subdimension overflows (e.g., write the data output to memory after every M number of data elements for a pooling operation, etc.).

Figure 3:
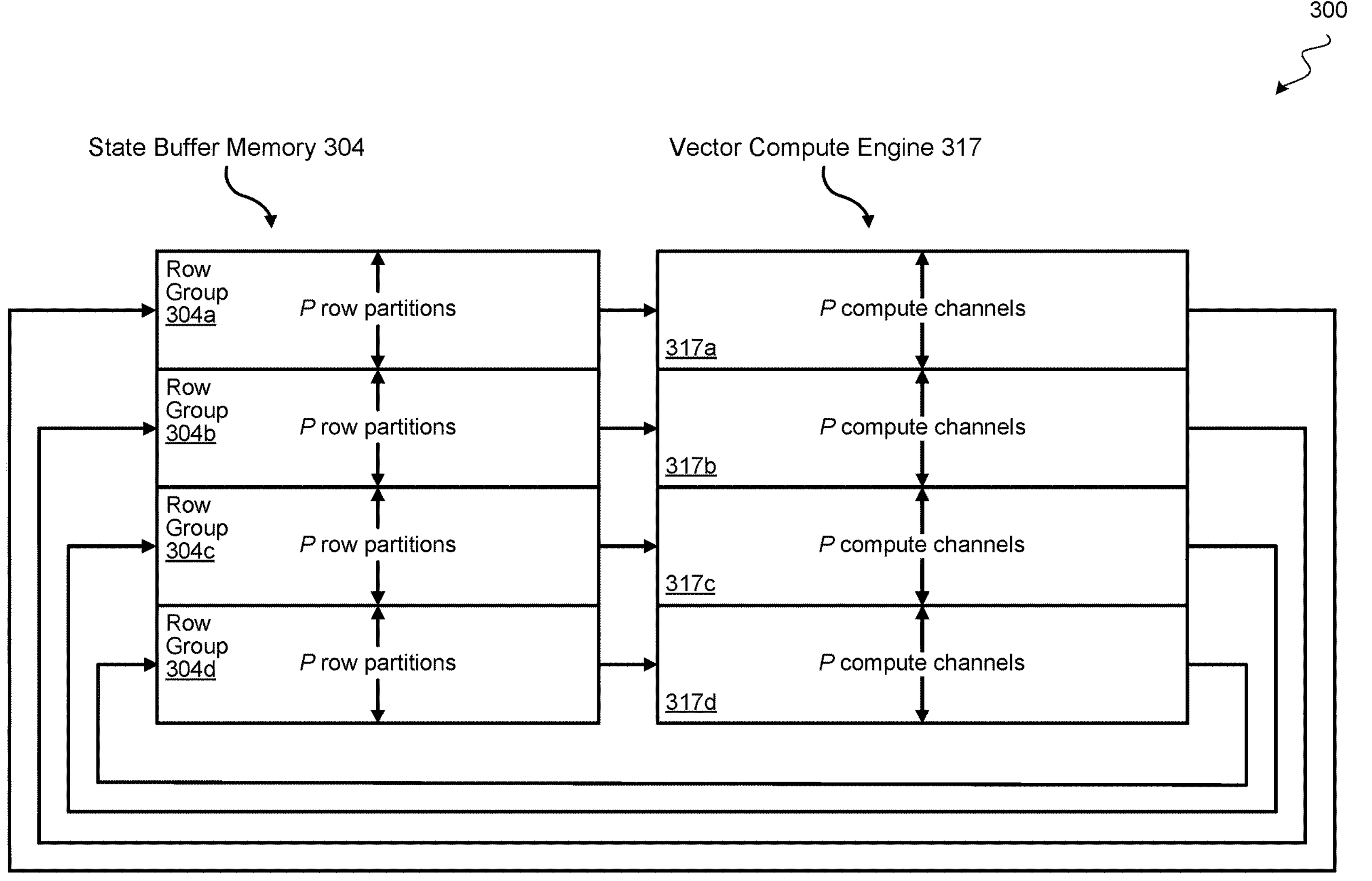
FIG. 3 illustrates a block diagram of an example of a portion of an integrated circuit device that includes a vector compute engine.

FIG. 3 illustrates a block diagram of an example of a portion of a neural network accelerator 300 that includes a vector compute engine 317 and a state buffer memory 304. Neural network accelerator 300 may include other components not specifically shown such as a processing engine (PE) array (e.g., a systolic array tailored for matrix multiplication operations), a results buffer for storing outputs of the PE array, and/or other compute engines. Vector compute engine 317 may include multiple vector compute banks. In the example shown, vector compute engine 317 has four vector compute banks 317*a* to 317*d*. Each of the vector compute banks 317*a* to 317*d* may include P number of compute channels. Each compute channel can be implemented, for example, using integrated circuit 200, and may include a computational pipeline of ALU circuits coupled in series.

State buffer memory 304 can be an on-chip memory, and may act as a cache to store tensors or matrices for neural network accelerator 300 to process. For example, state buffer memory 304 may store tensors representing input data such as feature maps, weight values, and/or intermediate results of in-progress computations of a neural network. State buffer memory 304 may include multiple row partitions organized into row groups. In the example shown, state buffer memory 304 has four row groups 304*a* to 304*d*, and each of the row groups includes P number of row partitions. Hence, if state buffer memory 304 has 128 row partitions, then each row group may have 32 row partitions.

Vector compute engine 317 may read data from the row partitions of state buffer memory 304, and may include the same number of compute channels as the number of row partitions. For example, if there are 128 row partitions in state buffer memory 304, vector compute engine 317 may include 128 compute channels such that the data from each row partition can be processed by a corresponding compute channel. The data being inputted to a compute channel may correspond to a vector of a tensor stored in state buffer memory 304. By having multiple compute channels, vector compute engine 317 can process multiple vectors of a tensor in parallel.

The vector compute banks 317*a* to 317*d* can be coupled to respective row groups 204*a* to 204*d* of state buffer memory 304. Hence, each vector compute bank processes data from a corresponding row group. As shown in FIG. 3, the output of each vector compute bank can be written back to the corresponding row group of state buffer memory 304. Each of the vector compute banks 317*a* to 317*d* can be configured independently from each other to process data from their respective row groups 304*a* to 304*d*. Vector compute banks 317*a* to 317*d* (or a subset thereof) may also operate collectively to process data from a tensor that spans multiple row groups.

As mentioned above, the compute channels in vector compute engine 317 can operate in parallel and generate outputs in parallel. Each of the parallel outputs generated by the compute channels can be generated from a corresponding vector of data elements read from a row partition of state buffer memory 304. The output generated from a compute channel can be an output vector generated by applying an elementwise operation to each element of the vector inputted into the compute channel. In other words, when a vector of T elements is streamed into a compute channel, the compute channel may output T number of elements processed by the compute engine. Such operation can be used, for example, to scale and/or apply an offset to each of the data elements streamed into the compute engine. The output of a compute channel can also be one or more output values generated by performing one or more computations on a combination of data elements of the vector inputted into the compute channel. For example, the output value(s) can be a mean computed over the data elements streamed into the compute channel, and/or a variance computed over the elements streamed into the compute channel. In some implementations, the compute channel may output the mean, variance, and count of the elements inputted into the compute channel from a single pass of the elements steamed into the compute channel. Other types of computations that a compute channel may perform can include pooling operations to downsample a tensor, finding the maximum/minimum values, and/or sorting the data elements in ascending/descending order, etc.

In the context of executing a neural network, vector compute engine 317 can be used to complement and/or offload computations from the PE array of neural network accelerator 300. For example, vector compute engine 317 can be used to perform tensor normalization of a tensor stored in state buffer memory 304 prior to inputting the tensor into the PE array for matrix multiplication operations. Although vector compute engine 317 is shown to read from and write back to state buffer memory 304, vector compute engine 317 can also process data read from a results buffer that stores outputs from the PE array. More generally, vector compute engine 317 may read input data from state buffer memory 304 and/or the results buffer, and write the computational outputs to state buffer memory 304 and/or the results buffer. It should also be noted that although vector compute engine 317 has been described in the context of a neural network accelerator, vector compute engine 317 can be implemented in other types of data processors such as central processing units (CPUs), graphics processing units (GPUs), digital signal processors (DSPs), etc.

Figure 4:
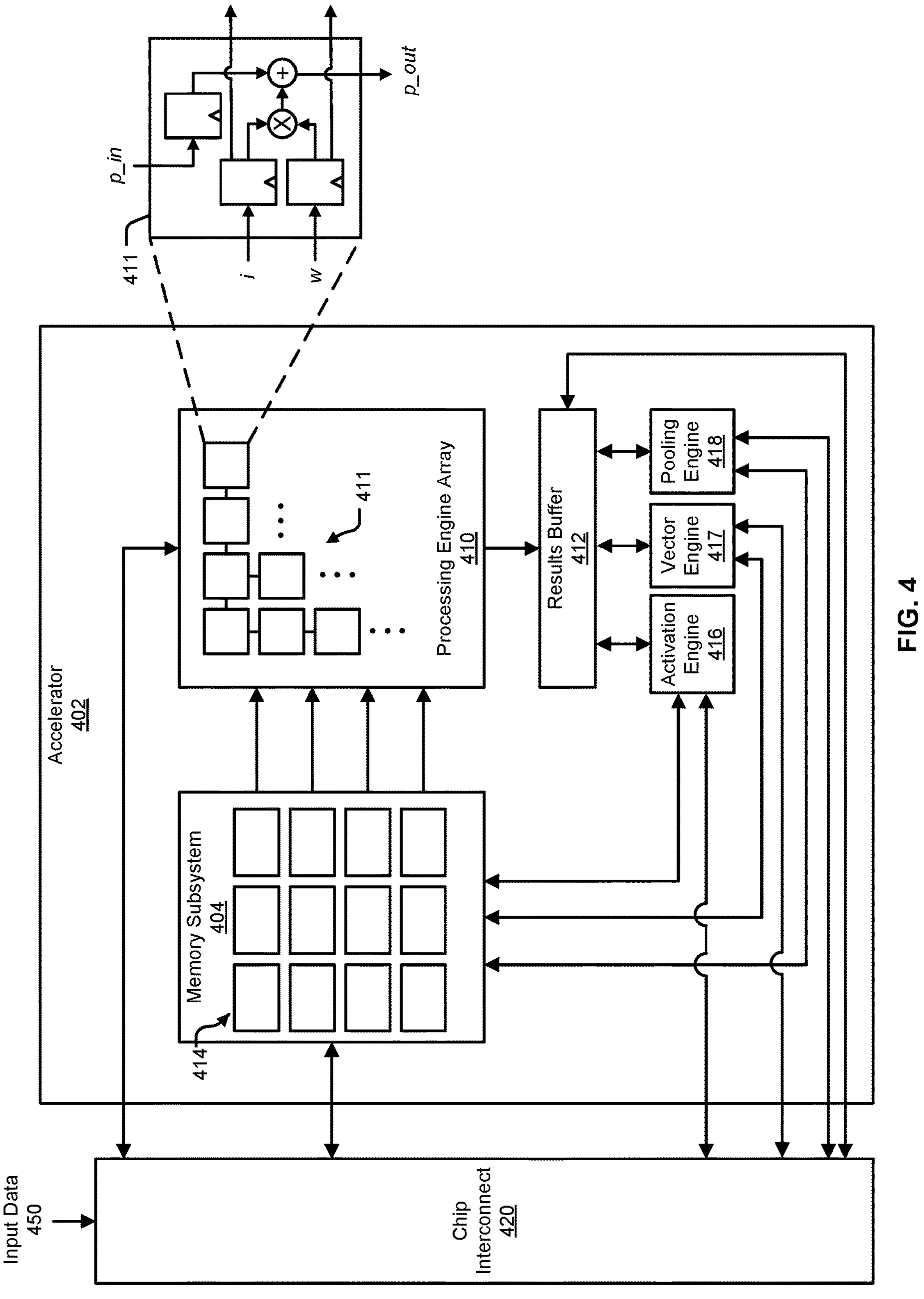
FIG. 4 illustrates a block diagram of an example of an integrated circuit device.

FIG. 4 is a block diagram illustrating an example of an integrated circuit device that can include an accelerator 402. In various examples, the accelerator 402, for a set of input data (e.g., input data 450), can execute computations using a processing engine array 410, an activation engine 416, a vector engine 417, and/or a pooling engine 418. In some examples, the example accelerator 402 may be an integrated circuit component of a processor, such as a neural network processor. The processor may have other integrated circuit components, including additional accelerator engines.

In various implementations, the memory subsystem 404 can include multiple memory banks 414. Memory subsystem 404 can also be referred to as a state buffer. In these implementations, each memory bank 414 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 414. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 404 can permit simultaneous access to the read or write channels of multiple memory banks. As another example, the memory subsystem 404 can include arbitration logic such that arbitration between, for example, the outputs of multiple memory banks 414 can result in more than one memory bank's output being used. In these and other examples, though globally managed by the memory subsystem 404, each memory bank can be operated independently of any other.

Having the memory banks 414 be independently accessible can increase the efficiency of the accelerator 402. For example, values can be simultaneously read and provided to each row of the processing engine array 410, so that the entire processing engine array 410 can be in use in one clock cycle. As another example, the memory banks 414 can be read at the same time that results computed by the processing engine array 410 are written to the memory subsystem 404. In contrast, a single memory may be able to service only one read or write at a time. With a single memory, multiple clock cycles can be required, for example, to read input data for each row of the processing engine array 410 before the processing engine array 410 can be started.

In various implementations, the memory subsystem 404 can be configured to simultaneously service multiple clients, including the processing engine array 410, the activation engine 416, the vector engine 417, the pooling engine 418, and any external clients that access the memory subsystem 404 over a communication fabric 420. In some implementations, being able to service multiple clients can mean that the memory subsystem 404 has at least as many memory banks as there are clients. In some cases, each row of the processing engine array 410 can count as a separate client. In some cases, each column of the processing engine array 410 can output a result, such that each column can count as a separate write client. In some cases, output from the processing engine array 410 can be written into the memory banks 414 that can then subsequently provide input data for the processing engine array 410. As another example, the activation engine 416, the vector engine 417, and the pooling engine 418 can include multiple execution channels, each of which can be separate memory clients. The memory banks 414 can be implemented, for example, using static random access memory (SRAM).

In various implementations, the memory subsystem 404 can include control logic. The control logic can, for example, keep track of the address spaces of each of the memory banks 414, identify memory banks 414 to read from or write to, and/or move data between the memory banks 414. In some implementations, memory banks 414 can be hardwired to particular clients. For example, a set of memory banks 414 can be hardwired to provide values to the rows of the processing engine array 410, with one memory bank servicing each row. As another example, a set of memory banks can be hard wired to receive values from columns of the processing engine array 410, with one memory bank receiving data for each column.

The processing engine array 410 is the computation matrix of the example accelerator 402. The processing engine array 410 can, for example, execute parallel integration, convolution, correlation, and/or matrix multiplication, among other things. The processing engine array 410 includes multiple processing engines 411, arranged in rows and columns, such that results output by one processing engine 411 can be input directly into another processing engine 411. Processing engines 411 that are not on the outside edges of the processing engine array 410 thus can receive data to operate on from other processing engines 411, rather than from the memory subsystem 404.

In various examples, the processing engine array 410 uses systolic execution, in which data arrives at each processing engine 411 from different directions at regular intervals. In some examples, input data can flow into the processing engine array 410 from the left and weight values can be loaded at the top. In some examples weights and input data can flow from the left and partial sums can flow from top to bottom. In these and other examples, a multiply-and-accumulate operation moves through the processing engine array 410 as a diagonal wave front, with data moving to the right and down across the array. Control signals can be input at the left at the same time as weights, and can flow across and down along with the computation.

In various implementations, the number of columns in the processing engine array 410 determines the computational capacity of the processing engine array 410, and the number of rows determines the required memory bandwidth for achieving maximum utilization of the processing engine array 410. The processing engine array 410 can have, for example, 64 columns and 128 rows, or some other number of columns and/or rows.

An example of a processing engine 411 is illustrated in FIG. 4 in an inset diagram. As illustrated by this example, a processing engine 411 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 411.

In the illustrated example, an input from above can include a partial sum, p_in, provided either from another processing engine 411 or from a previous round of computation by the processing engine array 410. When starting a computation for a new set of input data, the top row of the processing engine array 410 can receive a fixed value for p_in, such as zero. As illustrated by this example, i and w are multiplied together and the result is summed with p_in to produce a new partial sum, p_out, which can be input into another processing engine 411. Various other implementations of the processing engine 411 are possible.

Outputs from the last row in the processing engine array 410 can be temporarily stored in the results buffer 412. The results can be intermediate results, which can be written to the memory banks 414 to be provided to the processing engine array 410 for additional computation. Alternatively, the results can be final results, which, once written to the memory banks 414 can be read from the memory subsystem 404 over the communication fabric 420, to be output by the system.

In some implementations, the accelerator 402 includes an activation engine 416. In these implementations, the activation engine 416 can combine the results from the processing engine array 410 into one or more output activations. For example, for a convolutional neural network, convolutions from multiple channels can be summed to produce an output activation for a single channel. In other examples, accumulating results from one or more columns in the processing engine array 410 may be needed to produce an output activation for a single node in the neural network. In some examples, activation engine 416 can be bypassed.

In various examples, the activation engine 416 can include multiple separate execution channels. In these examples, the execution channels can correspond to the columns of the processing engine array 410, and can perform an operation on the outputs of a column, the result of which can be stored in the memory subsystem 404. In these examples, the activation engine 416 may be able to perform between 1 and n parallel computations, where n is equal to the number of columns in the processing engine array 410. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 402 can include a pooling engine 418. Pooling is the combining of outputs of the columns of the processing engine array 410. Combining can include for example, computing a maximum value, a minimum value, an average value, a median value, a summation, a multiplication, or another logical or mathematical combination. In various examples, the pooling engine 418 can include multiple execution channels that can operating on values from corresponding columns of the processing engine array 410. In these examples, the pooling engine 418 may be able to perform between 1 and n parallel computations, where n is equal to the number of columns in the processing engine array 410. In various examples, execution channels of the pooling engine 418 can operate in parallel and/or simultaneously. In some examples, the pooling engine 418 can be bypassed.

In some implementations, the accelerator 402 can further include a vector engine 417 (may also be referred to as a vector compute engine or deep vector engine). Vector engine 1117 can be implemented using, for example, components of vector compute engine 317, and may include multiple compute channels implemented using integrated circuit 200. Vector engine 417 is a compute engine that can perform computations and manipulations on values stored in memory subsystem 404 and/or results buffer 412 such as values representing matrices of input values, weight values, intermediate results, etc. Vector engine 417 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 417 can operate in parallel and/or simultaneously. In some examples, the vector engine 417 can be bypassed or be omitted.

Herein, the activation engine 416, the vector engine 417, and the pooling engine 418 may be referred to collectively as execution engines. The processing engine array 410 is another example of an execution engine. Another example of an execution engine is a Direct Memory Access (DMA) engine, which may be located outside the accelerator 402.

Input data 450 can arrive over the communication fabric 420. The communication fabric 420 can connect the accelerator 402 to other components of a processor, such as a DMA engine that can obtain input data 450 from an Input/Output (I/O) device, a storage drive, or a network interface. The input data 450 can be, for example one-dimensional data, such as a character string or numerical sequence, or two-dimensional data, such as an array of pixel values for an image or frequency and amplitude values over time for an audio signal. In some examples, the input data 450 can be three-dimensional, as may be the case with, for example, the situational information used by a self-driving car or virtual reality data. In some implementations, the memory subsystem 404 can include a separate buffer for the input data 450. In some implementations, the input data 450 can be stored in the memory banks 414 when the accelerator 402 receives the input data 450.

In some examples, the accelerator 402 can implement a neural network processing engine. In these examples, the accelerator 402, for a set of input data 450, can execute a neural network to perform a task for which the neural network was trained. Executing a neural network on a set of input data can be referred to as inference or performing inference.

The weights for the neural network can be stored in the memory subsystem 404, along with input data 450 on which the neural network will operate. The neural network can also include instructions, which can program the processing engine array 410 to perform various computations on the weights and the input data. The instructions can also be stored in the memory subsystem 404, in the memory banks 414 or in a separate instruction buffer. The processing engine array 410 can output intermediate results, which represent the outputs of individual layers of the neural network. In some cases, the activation engine 416, the vector engine 417, and/or pooling engine 418 may be enabled for computations called for by certain layers of the neural network. The accelerator 402 can store the intermediate results in the memory subsystem 404 for inputting into the processing engine array 410 to compute results for the next layer of the neural network. The processing engine array 410 can further output final results from a last layer of the neural network. The final results can be stored in the memory subsystem 404 and then be copied out to host processor memory or to another location.

Figure 5:
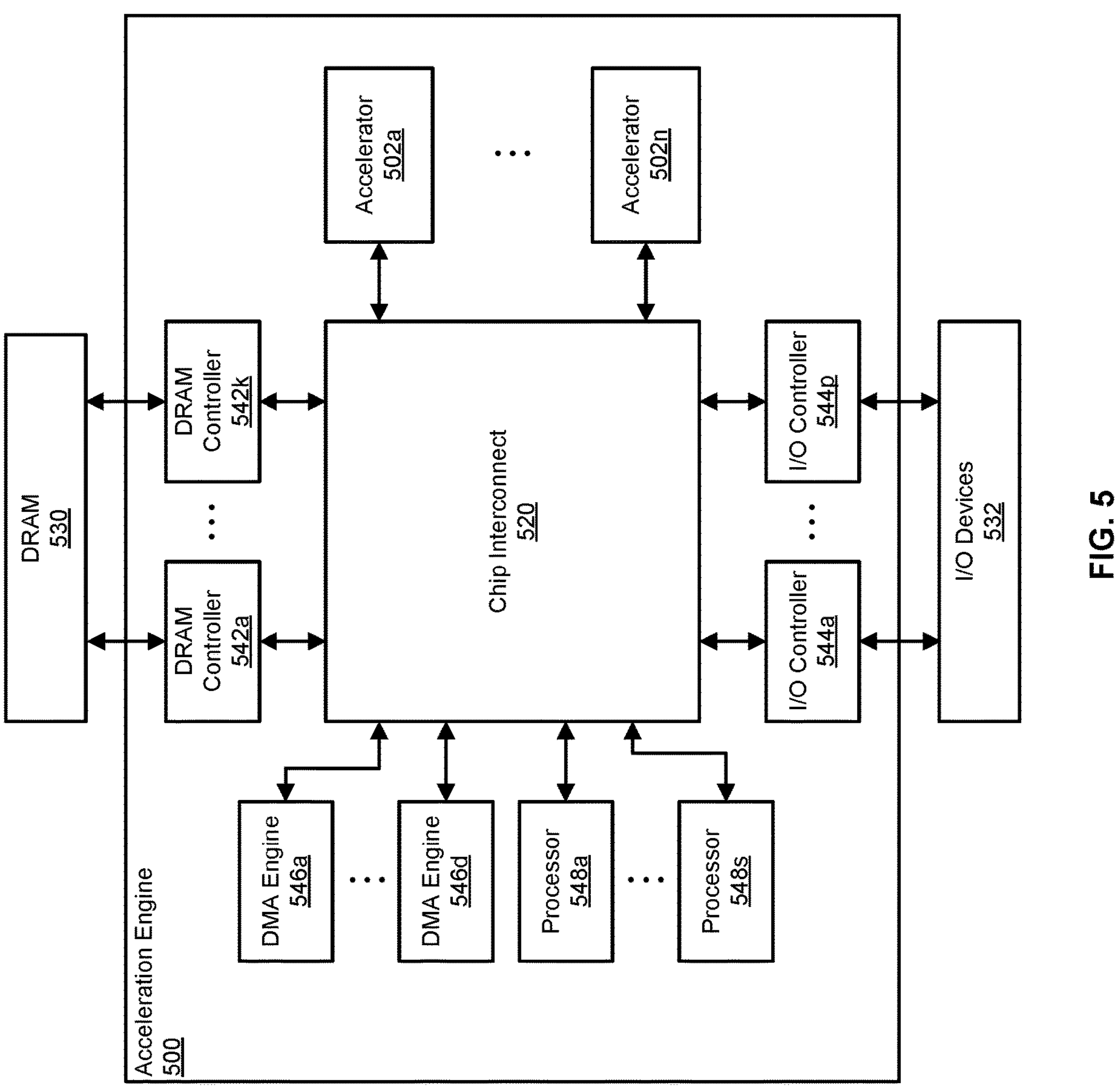
FIG. 5 illustrates a block diagram of an example of an acceleration engine.

FIG. 5 includes a block diagram that illustrates an example of an acceleration engine 500. The acceleration engine 500 is an example of an integrated circuit that can include one or more accelerators 502*a*-502*n* that may be similar to the accelerator illustrated in FIG. 4.

In the example of FIG. 5, the acceleration engine 500 includes multiple accelerators 502*a*-502*n*, each of which can perform a set of operations. In various examples, the accelerators 502*a*-502*n* are for particular types of operations, so that the accelerators 502*a*-502*n* can perform the operations much faster than when similar operations are performed by a general-purpose processor. In various examples, to perform a set of operations, input data on which the operations are to be performed must first be moved into the accelerators 502*a*-502*n*. Additionally, in some cases, program code is also moved into the accelerators 502*a*-502*n*, which programs the operations that the accelerators 502*a*-502*n* will perform on the data. In the illustrated example, the acceleration engine 500 includes n accelerators 502*a*-502*n*. Examples of accelerators that can be included in the acceleration engine 500 include graphics accelerators, floating point accelerators, neural network accelerators, and others. In various examples, the accelerators 502*a*-502*n* can each be the same (e.g., each of the is a graphics accelerator) or can be different (e.g., the accelerators 502*a*-502*n* include a graphics accelerator, a floating point accelerator, and neural network accelerator).

The example acceleration engine 500 further includes DRAM controllers 542*a*-542*k* for communicating with an external memory. The external memory is implemented, in this example, using DRAM 530. In the illustrated example, the acceleration engine 500 includes k DRAM controllers 542*a*-542*k*, each of which may be able to communicate with an independent set of banks of DRAM. In other examples, other types of RAM technology can be used for the external memory. The DRAM controllers 542_a_-542_k_ can also be referred to as memory controllers.

In various examples, input data and/or program code for the accelerators 502_a_-502_n_ can be stored in the DRAM 530. Different programs can cause the accelerators 502_a_-502_n_ to perform different operations. For example, when one of the accelerators is a neural network accelerator, one program can configure the neural network accelerator to perform speech recognition while another program can configure the neural network accelerator to perform image recognition. In various examples, different accelerators 502_a_-502_n_ can be programmed with different programs, so that each performs a different set of operations. In various examples, the processors 548_a_-548_s_ can manage moving of program code from the DRAM 530 to the accelerators 502_a_-502_n_.

The example acceleration engine 500 further includes I/O controllers 544_a_-544_p_ for communicating with I/O devices 532 in the system. The acceleration engine 500 can communicate with I/O devices over, for example, a processor bus. In some examples, the processor bus can be implemented using Peripheral Component Interconnect (PCI) and/or a variation of the PCI bus protocol. The processor bus can connect the acceleration engine 500 to I/O devices such as, for example, input and output devices, memory controllers, storage devices, and/or network interface cards, among other things. In some examples, the I/O controllers 544-544_p_ can enable the acceleration engine 500 to act as an I/O device for a host processor. For example, the acceleration engine 500 can be the recipient of input data from the host processor, and a command indicating an operation to be performed on the input data (e.g., a particular computation or analysis). In the illustrated example, the acceleration engine 500 includes p I/O controllers 544_a_-544_p_, each of which may include a separate root complex and may communicate with a separate set of I/O devices 532. In other examples, other standardized bus protocols, such as Ultra Path Interconnect (UPI) can be used for the host bus. In other examples, a proprietary bus protocol can be used.

Movement of data in the acceleration engine 500 can be managed by one or more processors 548_a_-548_s_, which can also be referred to as data management processors. In the example of FIG. 5, the acceleration engine 500 includes s processors 548_a_-548_s_ incorporated into the device (e.g., on the same silicon die). In other examples, the processors 548_a_-548_s_ can be external to the acceleration engine 500 (e.g., on a different die and/or in a different package). In some examples, the processors 548_a_-548_s_ can manage the movement of data from I/O devices 532 to the accelerators 502_a_-502_n_ or the DRAM 530. For example, input data may be located at an I/O device 532 or in processor memory, and the processors 548_a_-548_s_ can move the input from the I/O device 532 or processor memory into an accelerator or into DRAM 530. As another example, program code for the accelerators 502_a_-502_n_ may be located on an I/O device 532 or in processor memory.

The example acceleration engine 500 further includes DMA engines 546_a_-546_d_ that can move data between the accelerators 502_a_-502_n_, DRAM controllers 542_a_-542_k_, and I/O controllers 544_a_-544_p_. In the illustrated example, the acceleration engine 500 includes d DMA engines 546_a_-546_d_. In some implementations, the DMA engines 546_a_-546_d_ can be assigned to specific tasks, such as moving data from the DRAM controllers 542_a_-542_d_ to the accelerators 502_a_-502_n_, or moving data between the I/O controllers 544_a_-544_p_ and the accelerators 502_a_-502_n_. These tasks can be assigned, for example, by enqueueing descriptors with the DMA engines 546_a_-546_d_, where a descriptor identifies an address for a block of data and an operation (e.g., a read or a write) to perform. A descriptor, for example, can direct a DMA engine to instruct a DMA controller to read a block of data from DRAM 530. A descriptor can, as a further example, instruct the DMA engine to write data, read by the DMA controller, to an accelerator. Further descriptors can be used to move data from an accelerator to DRAM 530.

In various examples, each of the processors 548_a_-548_s_ can be responsible for managing the data movement for a different accelerator. In some examples, a processor may manage the data movement for more than one accelerator. Similarly, in various examples, each of the processors 548_a_-548_s_ can be assigned to one or more DMA engines 546_a_-546_d_. In these and other examples, associations between processors 548_a_-548_s_, accelerators 502_a_-502_n_, and DMA engines 546_a_-546_d_ are determined by program code being executed by each respective processor.

In the example acceleration engine 500, the various components can communicate over a chip interconnect 520. The chip interconnect 520 primarily includes wiring for routing data between the components of the acceleration engine 500. In some cases, the chip interconnect 520 can include a minimal amount of logic, such as multiplexors to control the direction of data, flip-flops for handling clock domain crossings, and timing logic.

Figure 6:
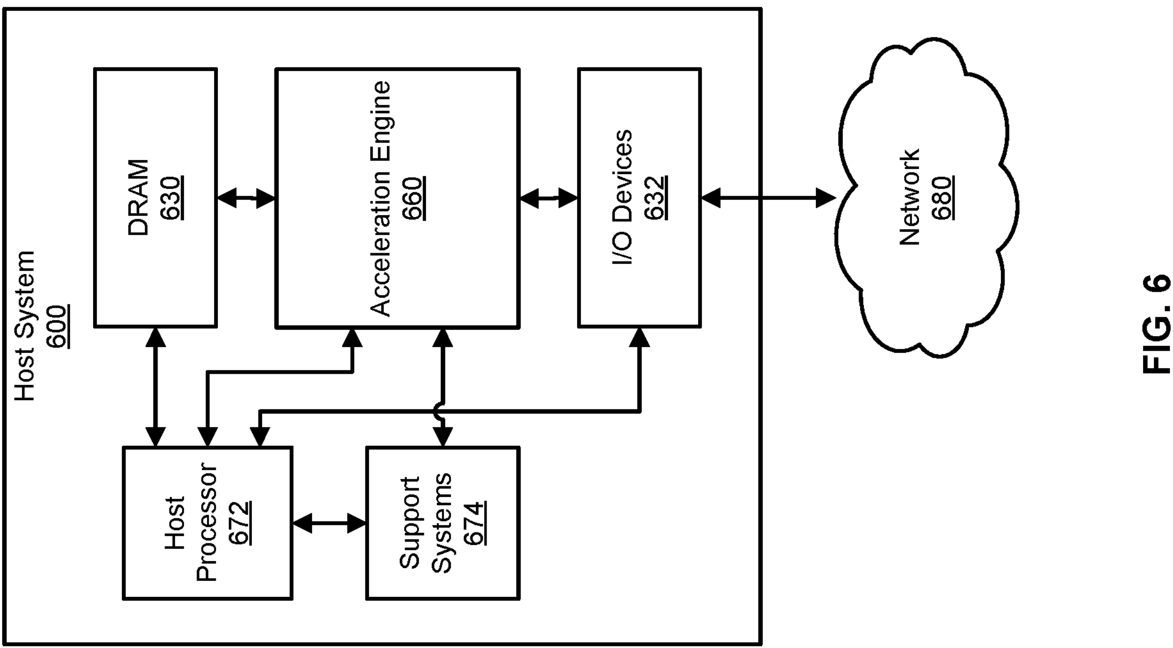
FIG. 6 illustrates a block diagram of an example of a host system.

FIG. 6 includes a block diagram that illustrates an example of a host system 600 in which an acceleration engine 660 can be used. The acceleration engine 660 of FIG. 6 is an example of a device that can include one or more accelerators such as is illustrated in FIG. 5. The example host system 600 of FIG. 6 includes the acceleration engine 660, a host processor 672, DRAM 630 or processor memory, I/O devices 632, and support systems 674. In various implementations, the host system 600 can include other hardware that is not illustrated here.

The host processor 672 is a general-purpose integrated circuit that is capable of executing program instructions. In some examples, the host processor 672 can include multiple processing cores. A multi-core processor may include multiple processing units within the same processor. In some examples, the host system 600 can include more than one host processor 672. In some examples, the host processor 672 and the acceleration engine 660 can be one chip, such as, one or more integrated circuits within the same package.

In various examples, the host processor 672 can communicate with other components in the host system 600 over one or more communication channels. For example, the host system 600 can include a host processor bus, which the host processor 672 can use to communicate with the DRAM 630, for example. As another example, the host system 600 can include an I/O bus, such as a PCI-based bus, over which the host processor 672 can communicate with the acceleration engine 660 and/or the I/O devices 632, for example. In various examples, the host system 600 can, alternatively or additionally, include other communication channels or busses, such as serial busses, power management busses, storage device busses, and so on.

In some examples, software programs executing on the host processor 672 can receive or generate input for processing by the acceleration engine 660. In some examples, the programs can select an appropriate neural network to execute for a given input. For example, a program may be for language translation, and can select one or more neural networks capable of speech recognition and/or machine translation. In these and other examples, the programs can configure the acceleration engine 660 with the neural network to execute, and/or can select a neural network processing engine on the acceleration engine 660 that has previously been configured to execute the desired neural network. In some examples, once the acceleration engine 660 has started an inference on input data, the host processor 672 can manage the movement of data (such as weights, instructions, intermediate results, results of conditional layers, and/or final results) into or out of the acceleration engine 660.

In some examples, a software program that is using the acceleration engine 660 to conduct an inference can read the result from a conditional layer from the acceleration engine 660 and/or from a storage location, such as in DRAM 630. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 630 is memory that is used by the host processor 672 for storage of program code that the host processor 672 is in the process of executing, as well as values that are being operated on. In some examples, the data for a neural network (e.g., weight values, instructions, and other data) can be all or partially stored in the DRAM 630. DRAM is a common term for processor memory, and though DRAM is volatile memory, processor memory can be volatile and/or non-volatile. Though not illustrated here, the host system 600 can include other volatile and non-volatile memories for other purposes. For example, the host system 600 can include a Read-Only Memory (ROM) that stores boot code for booting the host system 600 at power on, and/or Basic Input/Output System (BIOS) code.

Though not illustrated here, the DRAM 630 can store instructions for various programs, which can be loaded into and be executed by the host processor 672. For example, the DRAM 630 can be storing instructions for an operating system, one or more data stores, one or more application programs, one or more drivers, and/or services for implementing the features disclosed herein.

The operating system can manage and orchestrate the overall operation of the host system 600, such as scheduling tasks, executing applications, and/or controller peripheral devices, among other operations. In some examples, a host system 600 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 600. For example, some drivers can provide communication between the operating system and peripheral devices or I/O devices 632. Alternatively or additionally, some drivers may provide communication between application programs and the operating system, and/or application programs and peripheral devices accessible to the host system 600. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 632 can include hardware for connecting to user input and output devices, such as keyboards, mice, pens, tablets, voice input devices, touch input devices, displays or monitors, speakers, and printers, among other devices. The I/O devices 632 can also include storage drives and/or network interfaces for connecting to a network 680. For example, the host system 600 can use a network interface to communicate with storage devices, user terminals, other computing devices or servers, and/or other networks, among various examples.

In various examples, one or more of the I/O devices 632 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 600 or may be in an external enclosure. A storage device can be fixed (e.g., attached by screws) or removable (e.g., having a physical release mechanism and possibly a hot-plug mechanism).

Storage devices, the DRAM 630, and any other memory component in the host system 600 are examples of computer-readable storage media. Computer-readable storage media are physical mediums that are capable of storing data in a format that can be read by a device such as the host processor 672. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 632 can be PCI-based devices. In these examples, a PCI-based I/O device includes a PCI interface for communicating with the host system 600. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 674 can include hardware for coordinating the operations of the acceleration engine 660. For example, the support systems 674 can include a microprocessor that coordinates the activities of the acceleration engine 660, including moving data around on the acceleration engine 660. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 672. In some examples, the program executed by the microprocessor is stored on the hardware of microprocessor, or on a non-volatile memory chip in the host system 600. In some examples, the microprocessor and the acceleration engine 660 can be on chip, such as one integrated circuit on the same die and in the same package.

In some examples, the support systems 674 can be responsible for taking instructions from the host processor 672 when programs executing on the host processor 672 request the execution of a neural network. For example, the host processor 672 can provide the support systems 674 with a set of input data and a task that is to be performed on the set of input data. In this example, the support systems 674 can identify a neural network that can perform the task, and can program the acceleration engine 660 to execute the neural network on the set of input data. In some examples, the support systems 674 only needs to select an appropriate neural network processing engine of the neural network processor. In some examples, the support systems 674 may need to load the data for the neural network onto the acceleration engine 660 before the acceleration engine 660 can start executing the neural network. In these and other examples, the support systems 674 can further receive the output of executing the neural network, and provide the output back to the host processor 672.

In some examples, the operations of the support systems 674 can be handled by the host processor 672. In these examples, the support systems 674 may not be needed and can be omitted from the host system 600.

In various examples, the host system 600 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 600 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device comprising:

a plurality of computational circuit blocks coupled in series in a pipeline, wherein each computational circuit block includes:

an arithmetic logic unit (ALU) circuit having a first numeric input, a second numeric input, and a primary result output, wherein the ALU circuit is programmable to perform a computational operation on the first numeric input and the second numeric input to generate the primary result output;

a first input multiplexor operable to select one of a plurality of inputs of the computational circuit block as the first numeric input to the ALU circuit;

a second input multiplexor operable to select one of the plurality of inputs of the computational circuit block as the second numeric input to the ALU circuit;

an output register configured to receive the primary result output of the ALU circuit and provide the primary result output of the ALU circuit as a primary output of the computational circuit block;

feedback circuitry including one or more feedback registers each configured to receive the primary result output of the ALU circuit and provide the primary result output of the ALU circuit to a previous computational circuit block of the pipeline; and bypass circuitry including one or more bypass circuits each including a bypass multiplexor coupled to a bypass delay register, and operable to independently select one of the plurality of inputs of the computational circuit block to output to a next computational circuit block of the pipeline.

2. The integrated circuit device of claim 1, wherein the feedback circuitry of a computational circuit block includes multiple feedback registers to enable the computational circuit block to store multiple running computational results on different sets of data elements being streamed into the pipeline.

3. The integrated circuit device of claim 1, wherein the plurality of inputs of the computational circuit block includes a primary output of the previous computational circuit block of the pipeline, the primary output of the computational circuit block, an output of each feedback register of the next computational circuit block, and an output of each bypass circuit of the previous computational circuit block.

4. The integrated circuit device of claim 3,
wherein each computational circuit block further includes a swap register configured to receive a secondary output of the ALU circuit, and feedback the secondary output of the ALU circuit to the computational circuit block, the secondary output being one of the first numeric input or the second numeric input, and
wherein the plurality of inputs of the computational circuit block further includes an output of the swap register.

5. The integrated circuit device of claim 1, wherein the pipeline includes at least eight ALU circuits coupled in series.

6. An integrated circuit device comprising:
a plurality of computational circuit blocks coupled in series in a pipeline, wherein each computational circuit block includes:
an arithmetic logic unit (ALU) circuit having a first numeric input, a second numeric input, and a primary result output, wherein the ALU circuit is programmable to perform a computational operation on the first numeric input and the second numeric input to generate the primary result output;
an output register configured to receive the primary result output of the ALU circuit and provide the primary result output of the ALU circuit as a primary output of the computational circuit block;
a first feedback register configured to receive the primary result output of the ALU circuit and provide the primary result output of the ALU circuit to a previous computational circuit block of the pipeline; and
a second feedback register configured to receive the primary result output of the ALU circuit and provide the primary result output of the ALU circuit to the previous computational circuit block of the pipeline.

7. The integrated circuit device of claim 6, wherein each computational circuit block further includes:
a plurality of bypass circuits arranged in parallel, wherein each bypass circuit includes a bypass multiplexor coupled to a bypass delay register, and each bypass circuit is operable to independently select one of a plurality of inputs of the computational circuit block to output to a next computational circuit block of the pipeline.

8. The integrated circuit device of claim 7, wherein the plurality of inputs of the computational circuit block includes a primary output of the previous computational circuit block of the pipeline, the primary output of the computational circuit block, an output of a first feedback register of the next computational circuit block, an output of a second feedback register of the next computational circuit block, and an output of each bypass circuit of the previous computational circuit block.

9. The integrated circuit device of claim 8, wherein each computational circuit block further includes:
a first input multiplexor operable to select one of the plurality of inputs as the first numeric input to the ALU circuit; and
a second input multiplexor operable to select one of the plurality of inputs as the second numeric input to the ALU circuit.

10. The integrated circuit device of claim 9, wherein each computational circuit block further includes:
a swap register configured to receive a secondary output of the ALU circuit, and feedback the secondary output of the ALU circuit to the computational circuit block, the secondary output being one of the first numeric input or the second numeric input.

11. The integrated circuit device of claim 10, wherein the plurality of inputs selectable by at least one of the first and second input multiplexors includes an output of the swap register.

12. The integrated circuit device of claim 6, further comprising an input circuit operable to provide input data selectable from a plurality of data sources to the pipeline of computational circuit blocks, wherein the plurality of data sources includes:
a first tensor stored in a memory subsystem;
a second tensor stored in the memory subsystem; and
at least one of:
a parameter table;
a pseudo-random number generator; or
a counter.

13. The integrated circuit device of claim 12, wherein the plurality of data sources further includes:
a programmable constant value;
a zero value;
a floating-point one value;
an integer one value;
a positive infinity value; and
a negative infinity value.

14. The integrated circuit device of claim 12, wherein the plurality of data sources further includes a power-of-two value or a bit mask value.

15. The integrated circuit device of claim 6, wherein the first feedback register and the second feedback register have independent enable signals.

16. The integrated circuit device of claim 15, wherein the computational circuit block is programmable to sequentially enable the first feedback register alternately with the second feedback register.

17. An integrated circuit device comprising:
a plurality of computational circuit blocks coupled in series in a pipeline, wherein each computational circuit block includes:
an arithmetic logic unit (ALU) circuit having a first numeric input, a second numeric input, and a primary result output, wherein the ALU circuit is programmable to perform a computational operation on the first numeric input and the second numeric input to generate the primary result output;
an output register configured to receive the primary result output of the ALU circuit and provide the primary result output of the ALU circuit as a primary output of the computational circuit block;
feedback circuitry including one or more feedback registers each configured to receive the primary result output of the ALU circuit and provide the primary result output of the ALU circuit to a previous computational circuit block of the pipeline; and
a plurality of bypass circuits arranged in parallel, wherein each bypass circuit includes a bypass multiplexor coupled to a bypass delay register, and each bypass circuit is operable to independently select one of a plurality of inputs of the computational circuit block to output to a next computational circuit block of the pipeline.

18. The integrated circuit device of claim 17, wherein each computational circuit block further includes:
a first input multiplexor operable to select one of the plurality of inputs as the first numeric input to the ALU circuit; and a second input multiplexor operable to select one of the plurality of inputs as the second numeric input to the ALU circuit.

19. The integrated circuit device of claim 18, wherein the first input multiplexor or the second input multiplexor is operable to select an output of a bypass circuit of a previous computational circuit block as a numeric input to the ALU circuit.

20. The integrated circuit device of claim 17, wherein the bypass multiplexor is operable to select a primary output of a previous computational circuit block to provide to the next computational circuit block.

21. The integrated circuit device of claim 17, further comprising an output circuit coupled to a last computational circuit block of the pipeline, and operable to select between a primary output of the last computational circuit block and outputs of the bypass circuits of the last computation circuit block to write to memory.

* * * * *